US012279564B2

(12) United States Patent
Farrand et al.

(10) Patent No.: US 12,279,564 B2
(45) Date of Patent: Apr. 22, 2025

(54) METHOD FOR PREPARING FOR HARVESTING OF FOREST USING AN UNMANNED VEHICLE AND UN-MANNED VEHICLE AND SYSTEM USING SAID METHOD

(71) Applicant: DEEP FORESTRY AB, Uppsala (SE)

(72) Inventors: Levi Farrand, Uppsala (SE); Erik Österberg, Uppsala (SE); William Johnsson, Uppsala (SE)

(73) Assignee: DEEP FORESTRY AB, Uppsala (SE)

( * ) Notice: Subject to any disclaimer, the term of this patent is extended or adjusted under 35 U.S.C. 154(b) by 397 days.

(21) Appl. No.: 17/615,040

(22) PCT Filed: Jun. 22, 2020

(86) PCT No.: PCT/SE2020/050645
§ 371 (c)(1),
(2) Date: Nov. 29, 2021

(87) PCT Pub. No.: WO2020/263163
PCT Pub. Date: Dec. 30, 2020

(65) Prior Publication Data
US 2022/0225584 A1   Jul. 21, 2022

(30) Foreign Application Priority Data
Jun. 28, 2019  (SE) .................... 1950817-5

(51) Int. Cl.
*A01G 23/08* (2006.01)
*B64U 10/13* (2023.01)
(Continued)

(52) U.S. Cl.
CPC ........... *A01G 23/08* (2013.01); *G05D 1/0044* (2013.01); *G05D 1/0234* (2013.01);
(Continued)

(58) Field of Classification Search
CPC ...... A01G 23/08; A01G 23/00; B64C 39/024; B64U 2101/30; B64U 2201/10;
(Continued)

(56) References Cited

U.S. PATENT DOCUMENTS 8,275,547 B2 * 9/2012 Rousselle .............. G06Q 10/10
                                                    33/228
2005/0197175 A1 * 9/2005 Anderson .............. A01G 23/00
                                                    460/1

(Continued)

FOREIGN PATENT DOCUMENTS

EP      1317172 B1    2/2007
EP      2772814 A2    9/2014
(Continued)

*Primary Examiner* — Aniss Chad
*Assistant Examiner* — Christine Nguyen Huynh
(74) *Attorney, Agent, or Firm* — James S. Keddie; Bozicevic, Field & Francis LLP

(57) ABSTRACT

The present invention relates to a method for preparing for harvesting of forest using an un-manned vehicle (100) configured to move under the canopy in a forest region, the method comprising: for each of at least one object (110) within the forest region: —obtaining, using at least one sensor (120) of the un-manned vehicle (100), information associated with the object (110); —assigning an object identity (ID) to the object (110) based on the obtained sensor information, using processing circuitry (210) comprised in or accessible to the un-manned vehicle (100); and 10—associating a marker (130) with the object (110) and the obtained sensor information or the object identity (ID) assigned to the object (110). The invention also relates to an un-manned vehicle, a harvesting system and a non-transitory computer-readable storage medium.

21 Claims, 8 Drawing Sheets

(51) Int. Cl.
*B64U 101/28* (2023.01)
*B64U 101/30* (2023.01)
*B64U 101/40* (2023.01)
*G05D 1/00* (2024.01)
*G06V 20/10* (2022.01)
*G06V 20/17* (2022.01)

(52) U.S. Cl.
CPC ........... *G05D 1/0274* (2013.01); *G06V 20/17* (2022.01); *G06V 20/188* (2022.01); *B64U 10/13* (2023.01); *B64U 2101/28* (2023.01); *B64U 2101/30* (2023.01); *B64U 2101/40* (2023.01); *B64U 2201/10* (2023.01)

(58) Field of Classification Search
CPC ............................ B64U 10/13; B64U 2101/28; B64U 2101/40; G05D 1/0044; G05D 1/0234; G05D 1/0274; G06V 20/17; G06V 20/188; G06V 20/10; G06Q 50/02
See application file for complete search history.

(56) References Cited

U.S. PATENT DOCUMENTS

| | | | |
|---|---|---|---|
| 2008/0289724 A1* | 11/2008 | Sharplin | G01N 29/225 144/34.1 |
| 2014/0077969 A1* | 3/2014 | Vian | G08B 13/00 340/870.02 |
| 2014/0163781 A1 | 6/2014 | Vian et al. | |
| 2017/0075354 A1 | 3/2017 | Putkonen et al. | |
| 2018/0075596 A1 | 3/2018 | Fryshman | |
| 2018/0259496 A1* | 9/2018 | McPeek | G01N 33/025 |
| 2019/0095831 A1 | 3/2019 | Dudley et al. | |

FOREIGN PATENT DOCUMENTS

| | | |
|---|---|---|
| EP | 3125151 A2 | 2/2017 |
| WO | WO 98/17099 A1 | 4/1998 |
| WO | WO 2018/132058 A1 | 7/2018 |

* cited by examiner

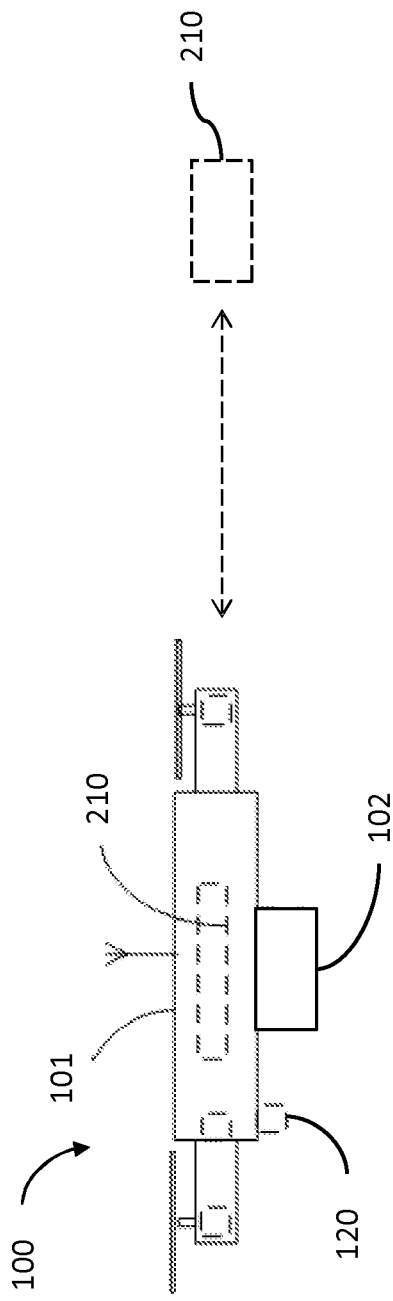
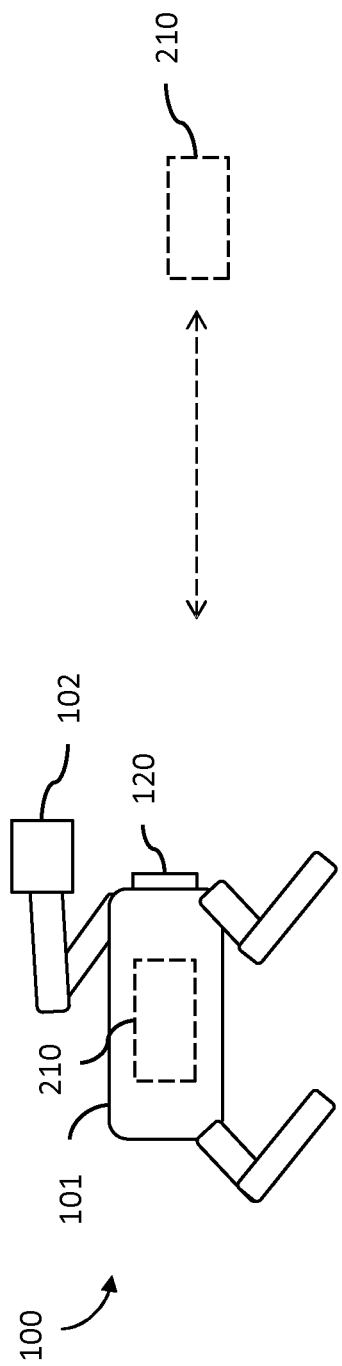
Figure 5a
Figure 5b

METHOD FOR PREPARING FOR HARVESTING OF FOREST USING AN UNMANNED VEHICLE AND UN-MANNED VEHICLE AND SYSTEM USING SAID METHOD

CROSS-REFERENCE TO RELATED APPLICATIONS

This application is a § 371 national phase of International Application No. PCT/SE2020/050645, filed on Jun. 22, 2020, which claims the benefit of Swedish Application No. 1950817-5, filed on Jun. 28, 2019, which applications are incorporated by reference herein.

TECHNICAL FIELD

The present invention relates to a method for preparing for harvesting of forest, wherein information associated with objects in a forest region is obtained and an object identity is assigned to each object in order to prepare for harvesting of trees in the forest region.

BACKGROUND

Harvesting of trees at an optimal time represents a skill that has a long tradition within the art of forestry. The selecting of trees for harvesting is usually performed as a multi-step process, where information is gathered about a forest or forest zone as a first step, e.g., from forestry maps and/or from a forest surveillance operation. The forestry maps and/or forest surveillance operations may be used to select a forest zone for harvesting; a forest zone in which the forest is deemed to have reached a harvestable maturity. Identification of individual tree objects to be harvested within the selected forest zone is performed as a second step, whereby decisions are made for the individual tree objects within the forest zone. The selecting involves determining which individual tree objects to harvest and performing a marking operation for the determined tree objects. Selecting of individual tree objects may also be performed for the purpose of identifying tree objects that are to be excluded from harvesting, e.g., for cultural heritage or biodiversity purposes.

In accordance with background art, preparation for harvesting of a forest zone, e.g., comprising the selecting of individual tree objects, is a time consuming process that is performed by boots on the ground, i.e., foresters walking around in the selected forest zone. The foresters prepare for harvesting of the zone by determining and marking the tree objects, e.g., by marking tree objects that fall within a criteria determined for trees to harvest or within a criteria for trees to maintain or by marking other objects that should be avoided by the harvester. The determining process is highly dependent on the skills and experience of the forester. Consequently, current solutions for selecting objects, e.g., tree objects, within a selected zone are usually time consuming and costly. Furthermore, current solutions result in a marking that may be perceived as arbitrary and with great discrepancies in terms of quality and consistency.

Another tree harvesting scenario that involves marking of individual objects relates to the need to scout a route prior to entering a harvester within a selected forest zone. In line with the above disclosed scenario of selecting individual tree objects, foresters also identify and mark blocking objects in a terrain of a selected forest zone. The objects are manually marked to improve the passage of the harvester in the terrain and also to enable planning of a harvesting route, e.g., in terms of a preferred route or a route to avoid.

However, there are no methods or systems available today that are able to prepare for harvesting in a forest region and provide all the information needed both in terms of how and what to harvest and in terms of biodiversity aspects and terrain routing aspects.

SUMMARY

The object of the present invention is to eliminate or at least to minimize the problems discussed above. This is achieved by a method for preparing for harvesting of forest, an un-manned vehicle configured to prepare for harvesting of forest, harvesting systems and software according to the appended independent claims.

The method for preparing for harvesting of forest comprises using an un-manned vehicle configured to move under the canopy in a forest region, and for each of at least one object within the forest region the method further comprises obtaining, using at least one sensor of the un-manned vehicle, information associated with the object. Furthermore, the method comprises assigning an object identity to the object based on the obtained sensor information, using processing circuitry comprised in or accessible to the un-manned vehicle. The method also comprises associating a marker with the object and the obtained sensor information or the object identity assigned to the object.

Thereby, harvesting preparations can be performed by an un-manned vehicle such as a drone. Sensor information corresponding to properties of each object can be gathered by the un-manned vehicle and by assigning an object identity and associating a marker with the object and the obtained sensor information or the object identity assigned to the object it is possible to make harvesting decisions and perform harvesting operations within the forest region without requiring a human forester. This achieves the benefit of a time efficient and cost efficient harvesting preparation that also increases the reliability and uniformity of information gathered and harvesting decisions taken so that the yield from the forest region is increased while biodiversity is retained and sensitive locations such as heritage sites are preserved.

Suitably, the method may further comprise obtaining a harvesting decision, using the processing circuitry, based on the obtained sensor information or the object identity assigned to the object, and associating the marker also with the harvesting decision. The harvesting decision may be made in connection with the obtaining, using at least one sensor of the un-manned vehicle, information associated with the object, i.e. while the un-manned vehicle is moving under the canopy. Alternatively, the harvesting decision may be made at a later time, optionally at a remote location. In some embodiments, the harvesting decision may be made using the processing circuitry that is comprised in or accessible to the un-manned vehicle but in other embodiments the harvesting decisions may be made by another processing circuitry or by a human operator that uses information and the assigned object identities to make the decision for each object. The harvesting decision may be based on obtained sensor information or the object identity assigned to a single object, or obtained sensor information and/or object identities assigned to a plurality of objects.

Thereby, the harvesting decisions are made automatically by the un-manned vehicle or system according to embodiments herein, which further contributes to the advantages of achieving time efficient and cost efficient harvesting preparation that also increases the reliability and uniformity of information gathered and harvesting decisions taken so that the yield from the forest region is increased while biodiversity is retained and sensitive locations such as heritage sites are preserved.

Suitably, assigning an object identity to the object, using the processing circuitry, comprises analyzing the sensor information to determine at least one property of the object and selecting an object identity, among a set of pre-stored object identity alternatives, based on the at least one property of the object. Such pre-stored object identity alternatives may be that an object is to be harvested or alternatively that the object is to be avoided. By using pre-stored object identity alternatives a very cost-efficient and simple method for preparing for harvesting can be achieved and still yield sufficient information to make harvesting decisions and perform harvesting based on the object identities assigned to the objects.

Alternatively, assigning an object identity to the object, using the processing circuitry, comprises analyzing the sensor information to determine a unique pattern associated with the object, generating a unique object identity, based on the determined unique pattern; and assigning the identity to the object. The unique pattern may be a bark print of the object where the object is a tree or could alternatively be a branch print or key graph, a color pattern or any other pattern that is unique to an object. Thereby, each object to which the method is applied is uniquely identified and associated with the sensor information obtained so that properties of the object can be associated uniquely with the object. When harvesting in the forest region, the association of sensor information with the unique object identity allows for the harvesting of each tree to be adapted to what is deemed optimal for that particular tree so that the yield from harvesting the forest is increased.

Alternatively, assigning an object identity to the object, using the processing circuitry, comprises analyzing the sensor information to determine a unique position associated with the object, generating a unique object identity, based on the determined unique position, and assigning the identity to the object. This allows for a very efficient association of the obtained sensor information with the specific location where the object is associated, so that harvesting is further improved.

Suitably, the method further comprises storing the information associated with the at least one object together with the identity of the object and the associated marker in a memory accessible to the un-manned vehicle. Thereby, digital markers relating to each object may be stored and can also form a point cloud or a map of the forest region comprising markers for each object and the information and possibly also the harvesting decisions associated with them. Harvesting can then be performed in the forest region using the digital markers alone or the digital markers combined with physical markers in the forest to ensure that the right trees are harvested in the desired manner and that some objects or locations are not disturbed by the harvester.

Preferably, the method also comprises that a harvester recognizes the marker, using at least one sensor of the harvester and that the harvester also obtains the harvesting decision for the object associated with the recognized marker and performs a harvesting action based on the harvesting decision related to the object. Thereby, harvesting can be made more efficient by using the preparations of the un-manned vehicle.

Suitably, the method also comprises that a harvester recognizes the marker, using at least one sensor of the harvester, obtains the harvesting decision for the object associated with the recognized marker and performs a harvesting action based on the harvesting decision related to the object. Thereby, harvesting may be performed in a more efficient way without requiring a human operator for recognizing the marker and harvesting objects in the determined way. The harvester can be made completely autonomous but can alternatively have a human operator available to perform some harvesting operations while allowing the harvester to work autonomously in other regards or may be controlled by a human operator at a remote location but also be configured to recognize the markers and harvest trees in the desired way.

Suitably, each of the at least one object is a tree or a part of a tree, a boundary of an area, an area un-fitted for a harvester to travel across, an existing path in the forest region, ancient remnants or monuments, a fallen tree with environmental heritage value, or another biological object of protection. The harvesting decision may be a decision to harvest the object, how to harvest the object, to not harvest the object or to avoid a location where the object is situated or a specified area within which the object is situated.

The method may also comprise generating a to scale 2D or 3D representation of at least a part of the forest region, or updating a to scale 2D or 3D representation of at least a part of the forest region by adding the marker associated with the object to the 2D or 3D representation. The 2D or 3D representation will in the following be denoted as a map. Thus, by generating or updating a 2D or 3D representation, a map comprising markers that designate the objects that will serve as the basis for a subsequent harvesting operation so that each marker shows where the object is located, giving the harvester detailed information as to how the forest region should be harvested.

Suitably, the marker is a physical marker and associating the marker with the object comprises attaching the physical marker to the object or a location in a vicinity of the object, or placing the marker on or in a vicinity of the object. The marker is thereby made visible in the forest region so that the harvester may harvest without the need for maps or so that information given in a map is combined with physical markers that are visible on site.

The vicinity of the object, which may also be referred to herein as the immediate vicinity of the object, is set or predefined based on which degree of accuracy that is required in the specific harvesting preparation or harvesting process. In a non-limiting example, the (immediate) vicinity of the object may be defined as more than or equal to 0 m, or more than or equal to 0.01 m, and less than or equal to 2 m from the object. In some further non-limiting examples, the (immediate) vicinity of the object may be defined as more than or equal to 0 m, or more than or equal to 0.01 m, and less than or equal to 1 m from the object, less than or equal to 5 dm from the object, less than or equal to 2 dm from the object, or less than or equal to 1 dm from the object. As a comparison, global position system (GPS) technology only provide position estimation with an error margin of about 20 m, which is obviously not accurate enough to enable reliably distinguishing one object (tree, rock, etc.) from another neighboring object in a forest region. This is why known solutions that use GOS positioning or similar positioning techniques typically refer to identifying a group of trees, an area with certain properties, and the like, and not positions of single objects such as trees.

The marker may be a digital marker and associating the marker with the object, and optionally the harvesting decision, may comprise storing the marker in association with the object identity and optionally the harvesting decision in a memory which may then be readily available by accessing the memory before or during harvesting.

The object may be a tree to be cut, and making a harvesting decision based on the obtained sensor information may comprise:

calculating, by the processing circuitry, a 3D shape of the trunk of the tree, based on the obtained sensor information; and calculating, by the processing circuitry, an optimal manner of cutting the tree trunk in at least one identified place in order to maximize the possible yield of high-quality wood for the tree, wherein associating a marker with the object and the harvesting decision may comprise physically marking each of the at least one identified place on the tree trunk, or digitally marking each of the at least one identified place on the tree trunk in a digital to scale 3D representation of the tree trunk. Thereby, detailed information on how to harvest the tree in an optimized way is obtained and the harvesting can proceed in an efficient way using that information.

According to the invention, an un-manned vehicle configured to prepare for harvesting of forest is provided. The un-manned vehicle comprises a body configured to move through a forest region under the canopy, and at least one sensor configured to obtain information associated with an object, wherein the un-manned vehicle comprises or is communicatively connected to processing circuitry configured to assign an object identity to the object based on the obtained sensor information, wherein the un-manned vehicle is further configured to associate a marker with the object and the obtained sensor information and/or the object identity assigned to the object. Thereby, the un-manned vehicle is able to prepare for harvesting while moving through a forest region so that the same region can later be harvested in an efficient way.

Preferably, the processing circuitry is further configured to make a harvesting decision based on the obtained sensor information and/or the object identity assigned to the object, and to further associate the marker with the harvesting decision.

Suitably, the un-manned vehicle is an un-manned aerial vehicle or an un-manned ground-based vehicle. An aerial vehicle has the advantage of an increased reach in a vertical direction so that more detailed information may be obtained regarding how an object should be harvested. It is also possible to pass through areas where the ground is not suitable for ground-based vehicles so that rivers and bogs can be crossed, for instance. A ground-based vehicle on the other hand can instead carry more equipment such as sensors and can have a longer battery time. The un-manned vehicle may be configured to be remote controlled, so that a control unit or a human user can direct the un-manned vehicle to regions of interest and also select objects that are to be analyzed. Alternatively, the un-manned vehicle may be an autonomous vehicle.

Suitably, the marker may be a physical marker and the un-manned vehicle may be configured to associate the marker with the object by attaching the physical marker to the object or a location in the immediate vicinity of the object, or placing the physical marker on the object or a location in the immediate vicinity of the object. Thereby, the un-manned vehicle may place markers in the forest regions so that the harvester or an operator using the harvester can identify the markers and harvest objects based on them. The physical marker may suitably be a wireless tag, e.g. an RFID tag, wherein the wireless tag can be controlled to make sound, release chem (chemicals), light up, release smoke etc. to make recognition easier. Alternatively, the physical marker may be in the form of spray paint, paint, tape, plastic band, staples, sticker, paint ball, a cut mark or similar, or a chemical that is released onto the object. The position of a wireless tag may be obtained using triangulation or based on signal transmission strength detection, in known manners. The wireless tag may be configured to provide wireless radio messages when prompted. The wireless radio messages may encode information such as: "I am here", "Do not go here", "I am a log", "I am a fallen log", I am a bog", "Go here", "Cut me", "Do not cut me" and others.

The marker could also be a digital marker and the un-manned vehicle may be configured to associate the marker with the object and the harvesting decision by storing the marker in association with the object identity and the harvesting decision in a memory. The digital marker may be a bark print, a branch print/tree graph, or an image of a cut mark made on the object by the un-manned vehicle.

The physical or digital marker may further be associated with a location on a 2D map, a 3D map, a 3D model; a point cloud, or other to scale representation of the forest region so that the location where the object is may be associated with a point on a map to facilitate locating the object during harvesting.

Suitably, the at least one sensor of the unmanned vehicle may comprise a stereoscopic camera, a time of flight sensor, an imaging sensor, a chemical sniffer, a LIDAR sensor or radar equipment.

The present invention also comprises a harvesting preparation system that comprises at least one un-manned vehicle according to the invention and that further comprises a remote control unit comprising processing circuitry and/or at least one additional un-manned vehicle according to the invention, wherein said remote control unit and/or additional un-manned vehicle is/are communicatively connected to the un-manned vehicle. Thereby, a control unit may control at least one un-manned vehicle but alternatively a plurality of un-manned vehicles that travel through a forest region. The processing circuitry may be located on each of the un-manned vehicles or may be in the remote control unit so that the un-manned vehicle(s) communicate(s) with the remote control unit for obtaining harvesting decisions and storing markers.

The remote control unit may thus suitably be configured to receive information associated with a plurality of markers from the at least one un-manned vehicle and to generate or update a map based on the received information.

The present invention further comprises another harvesting system that comprises at least one un-manned vehicle according to the invention and that further comprises at least one harvester, wherein each harvester is communicatively connected to the processing circuitry comprised in or communicatively connected to the at least one un-manned vehicle. Thereby, a complete harvesting preparation and harvesting operation may be performed by the un-manned vehicle obtaining sensor information of objects in the forest region, associating object identities with them and marking them so that they can be harvested in an optimized way by the harvester. Suitably, the un-manned vehicle operates in the forest region first and the harvester follows later and uses the markers associated with the objects when harvesting. This has the advantage that the harvesting is prepared before the harvester itself is used, so that the harvesting can be planned beforehand. Alternatively, the un-manned vehicle may operate at the same time as the harvester and associate markers with objects that are soon to be harvested by the harvester. This has the advantage that the harvesting is time-efficient and does not require extensive preparation before harvesting can begin. It is also possible to send the un-manned vehicle in different directions in the forest region depending on where a human operator of the harvester deems it most suitable to harvest at that particular time. The harvester may be configured to recognize markers and harvesting decisions associated with the markers and to perform one or more harvesting actions in a forest region based on said markers and harvesting decisions.

The present invention further comprises a non-transitory computer-readable storage medium storing instructions which, when executed by processing circuitry of a system, cause the system to: obtain information associated with the object; assign an object identity, ID, to the object based on the obtained sensor information; obtain a harvesting decision based on the obtained sensor information or the object identity, ID, assigned to the object; and associate a marker with the object and the harvesting decision.

The non-transitory computer-readable storage medium may further store instructions which, when executed by processing circuitry of a system, cause the system to, perform the method according to any of the appended method claims.

The effects and/or advantages presented in the present disclosure for embodiments of the method according to the first aspect may also apply to corresponding embodiments of the non-transitory computer-readable storage medium.

Many additional benefits and advantages of the present invention will be readily understood by the skilled person in view of the detailed description below.

It is noted that embodiments of the present disclosure relate to all possible combinations of features recited in the claims.

DRAWINGS

The invention will now be described in more detail with reference to the appended drawings, wherein FIG. 1 illustrates a use case scenario for a harvesting preparation solution according to one or more embodiments;

Figures 4A, 4B:
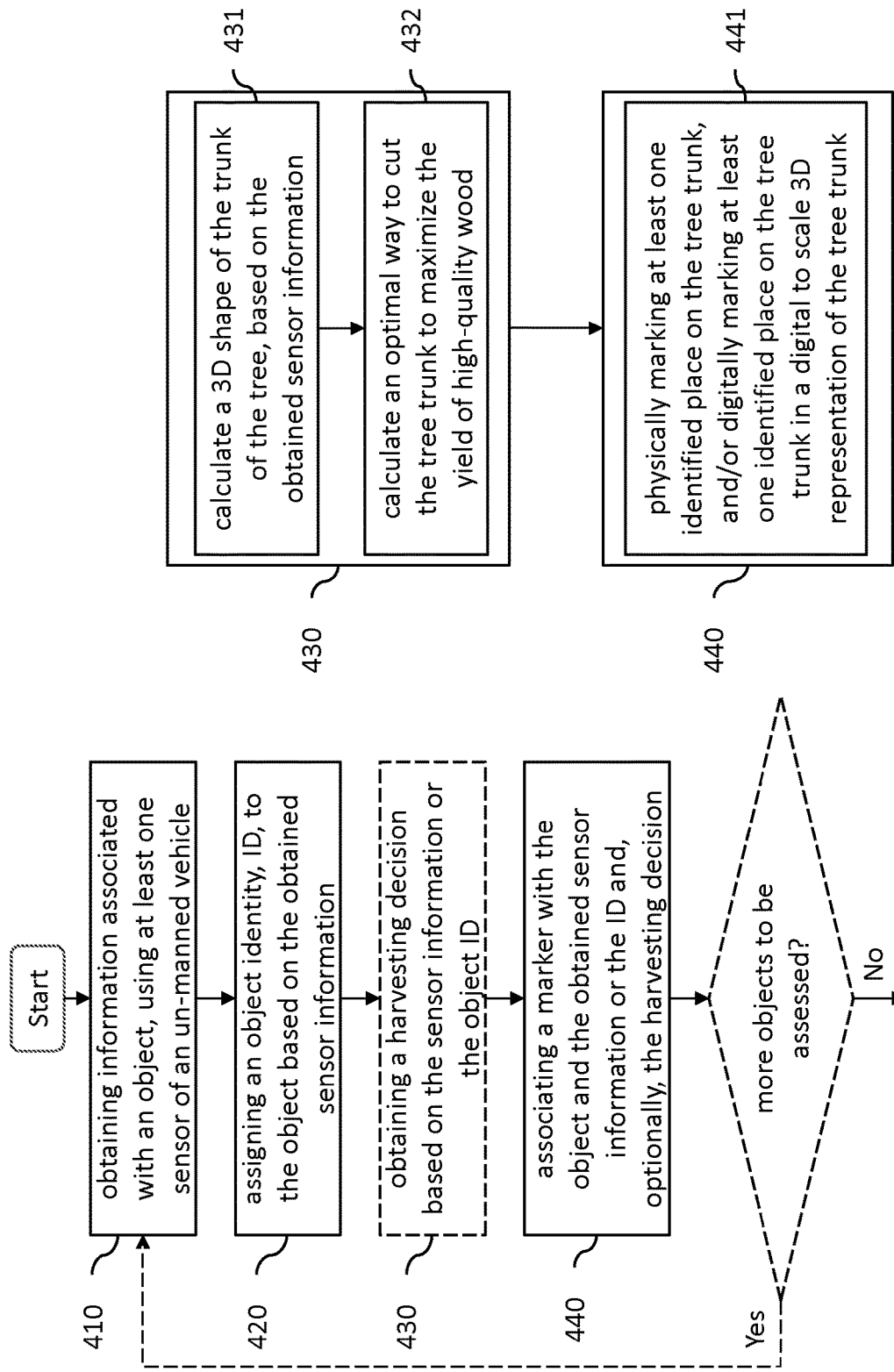
Figure 6C:
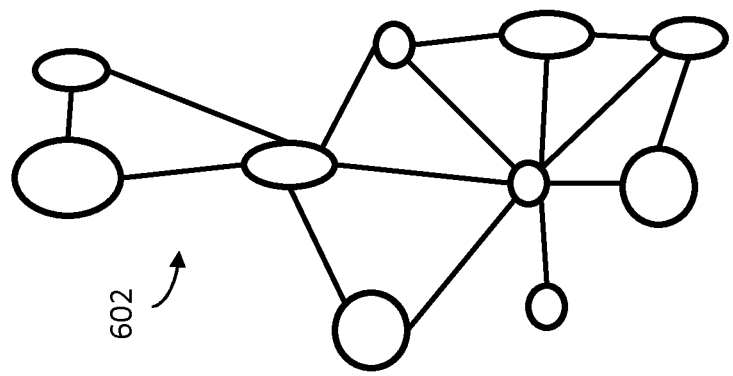
Figure 6B:
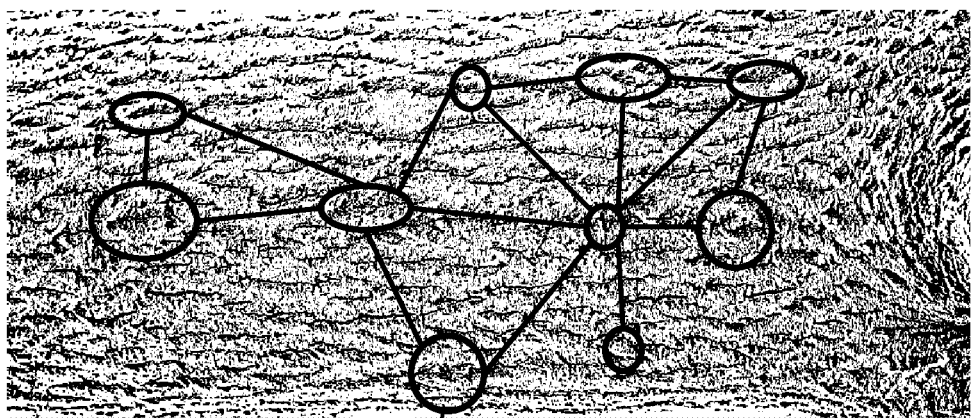
Figure 6A:
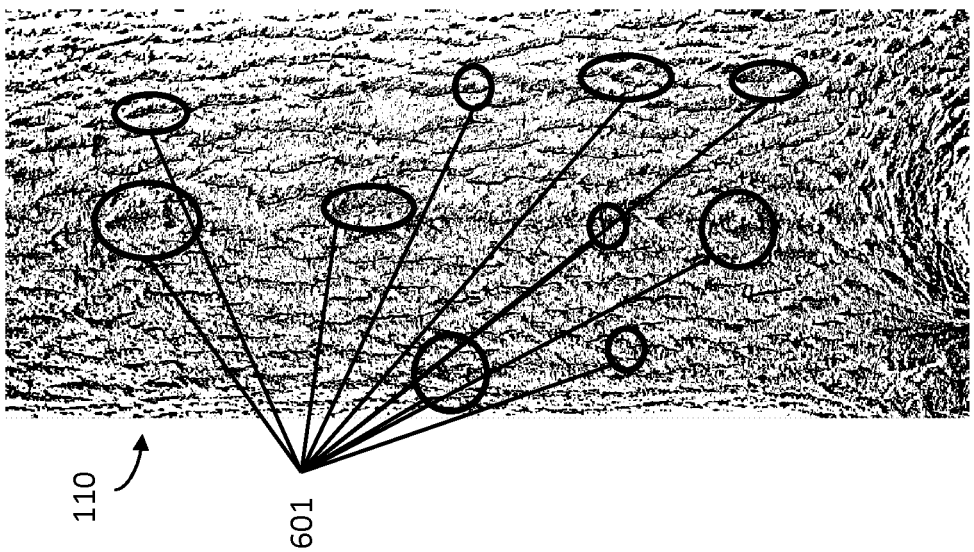
Figure 7B:
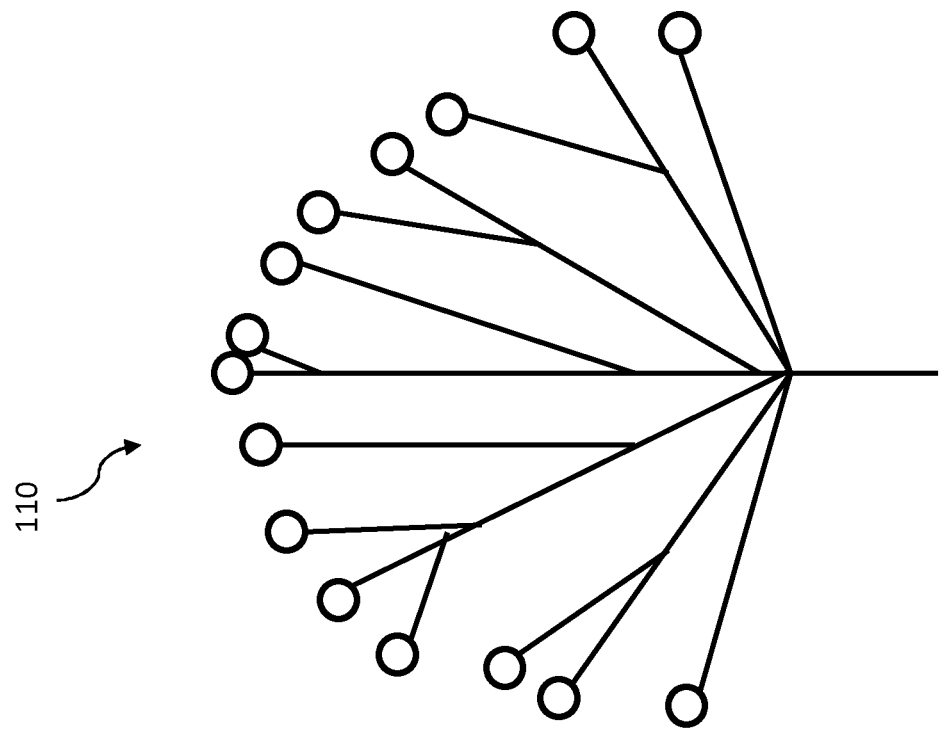
Figure 7A:
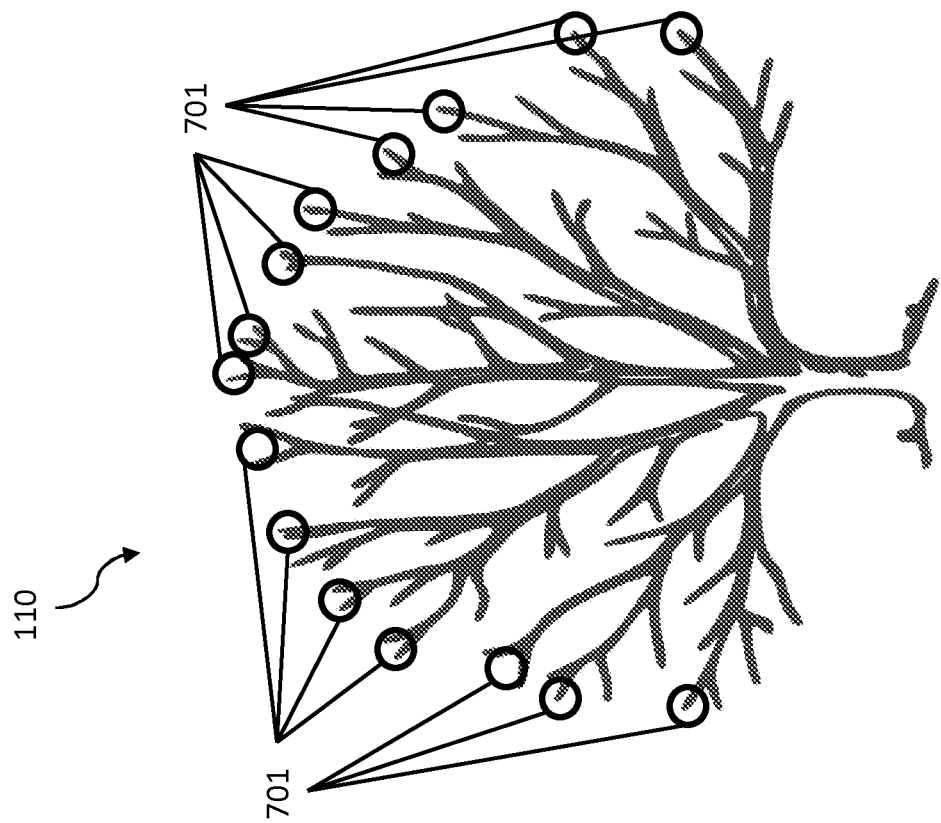
Figure 8:
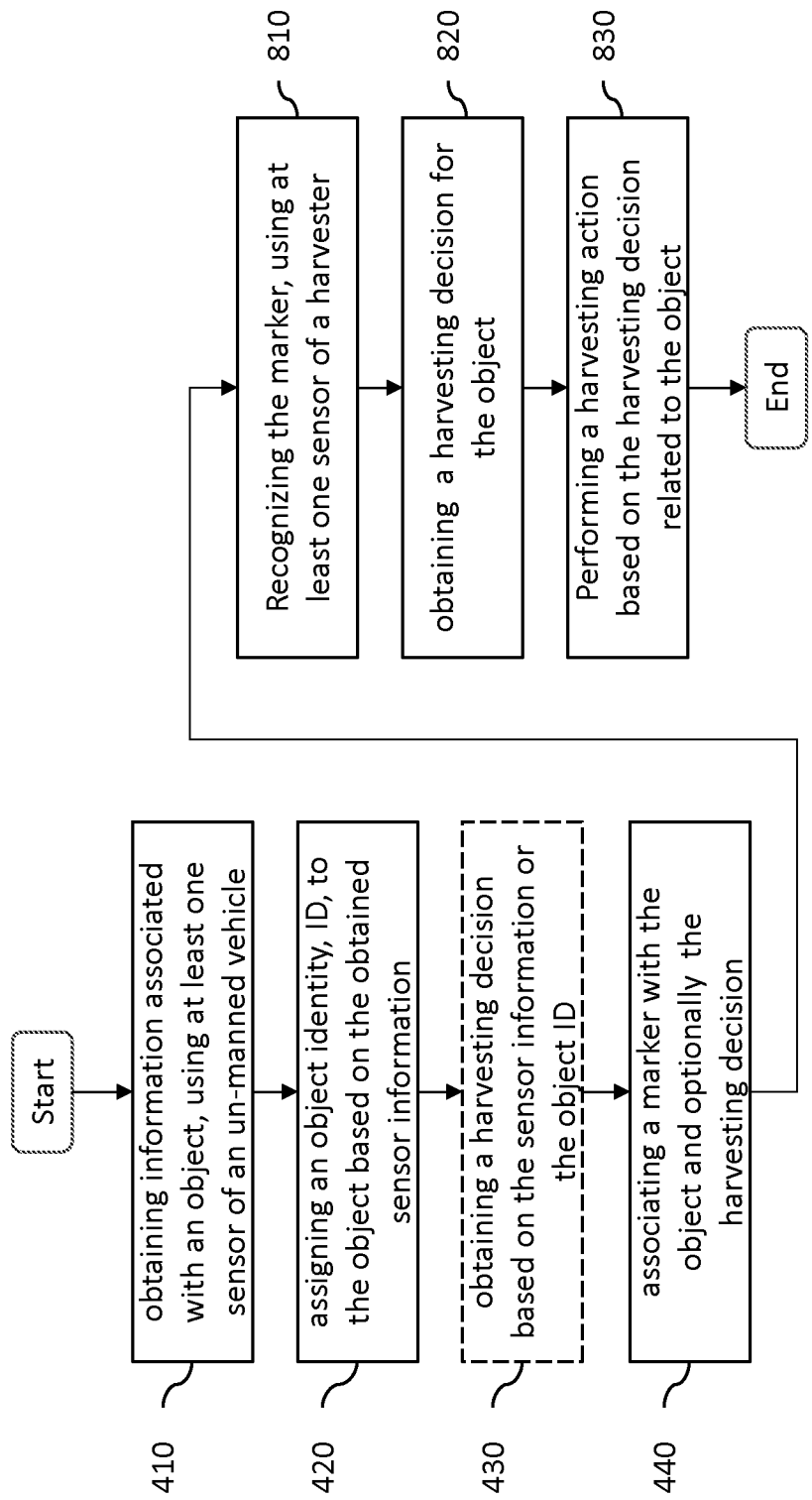

FIG. 4*a* is a flow chart of a method for harvesting preparation, according to one or more embodiments;

FIG. 4*b* is a flow chart showing sub-steps of a method for harvesting preparation, according to one or more embodiments;

FIG. 5*a* shows an exemplary un-manned vehicle according to one or more embodiment;

FIG. 5*b* shows an exemplary un-manned vehicle according to one or more embodiment;

FIGS. 6*a* to *c* illustrate determination of a unique pattern associated with an object, according to one or more embodiments;

FIGS. 7*a* to *b* illustrate determination of a unique pattern associated with an object, according to one or more embodiments; and FIG. 8 is a flow chart of a method for harvesting preparation, according to one or more embodiments.

All the figures are schematic, not necessarily to scale, and generally only show parts which are necessary in order to elucidate the respective embodiments, whereas other parts may be omitted or merely suggested. Any reference number appearing in multiple drawings refers to the same object or feature throughout the drawings, unless otherwise indicated.

DETAILED DESCRIPTION

Introduction

Aspects of the present disclosure will be described more fully hereinafter with reference to the accompanying drawings. The devices and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Throughout the description, the term harvester is to be understood as a harvesting machine.

As described in more detail on the background and summary, known solutions relating to preparing a forest area for harvesting comprise a human forester manually walking around in a selected forest zone and manually making assessments with regard to identifying objects such as trees, areas not suitable for a harvester to travel, blocking objects, objects that are to be excluded from harvesting, e.g., for cultural heritage or biodiversity purposes, etc. The known solutions further comprise the human forester manually marking identified objects in a manner that a human driver of a harvester will be able to recognize from through the windscreen of the harvester, so that the human driver can, in situ, make a harvesting decision relating to the object, e.g. to cut down a certain tree, not to cut down another tree, not to enter an area, to avoid an object in its path, etc. For this to work properly, the human driver must firstly be able to see the marker from the windscreen, whereby the marker must be placed in a suitable location for viewing from that location and angle, and secondly the human driver must be attentive and go slow enough to manually register a marking, assess its meaning and react to it by adjusting the path of the harvester, prepare for harvesting, or other suitable action depending on how the marking should be interpreted.

As can be clearly understood the known, manual, harvesting preparation methods are time consuming and costly processes. Furthermore, the determining processes are highly dependent on the skills and experience of the human forester as well as the human driver of the harvester. Furthermore, the currently known solutions, being manually performed, result in a marking that may be perceived as arbitrary and with great discrepancies in terms of quality and consistency. Also, the human forester cannot be expected to assess and mark every tree, bog, etc. within the area, which further adds to the result becoming arbitrary and with great discrepancies in terms of quality and consistency.

The inventors have realized that this time-consuming, costly, inefficient, experience-dependent and unpredictable process can be improved. Embodiments of the present disclosure aim at solving, or at least ameliorating, the ensuing problem by an at least partly automated solution for harvesting preparation according to the embodiments presented herein.

Methods, devices, systems and associated storage media for harvest preparation will be described below with reference to FIGS. 1-8.

For the purpose of the present invention, an object identity is defined as information set to denote a given object so that that object can be separated from other objects. The object identity can be a unique object identity that separates an object from every other object, or it can alternatively be information that denotes the object as belonging to a group of objects that have at least one common characteristic. That common characteristic can be a category to which the object belongs, such as "tree", "boulder", or "bog", or a subcategory within one such category such as "tree with a height exceeding a predetermined threshold value", or "tree of a given species". The common characteristic can alternatively be a harvesting decision suitable for the object, such as "tree to be harvested", "tree not to be harvested" or "area or object to be avoided".

Pre-stored object identity alternatives may be defined as a set of such categories or characteristics that are determined before harvesting preparation so that each assessed object may be determined as belonging to one of the available alternatives.

A harvesting decision is defined as a decision for if or how an object should be harvested. The harvesting decision may be merely "tree to be harvested" or "tree not to be harvested", but it could also be more detailed and specify how harvesting should be performed.

A harvesting action is defined as an action taken in relation to an object during harvesting in a forest region. The harvesting action may be to harvest an object, to harvest an object in a particular way, or it can alternatively be to leave the object in place or to avoid the object by being at least at a predetermined distance to the object. The harvesting action is suitably performed based on a harvesting decision associated with an object.

A unique pattern is defined as an appearance of an object that is unique to that object. The unique pattern may be a color pattern representing the color distribution on an object or a part of the object, and/or a shape or dimensions of the object or a part of the object, which differs from the shape of every other object in a forest region. The unique pattern may be a pattern representing one or more features on the surface of the object, which are recognizable using image processing, and which together form a pattern that differs from pattern of every other object in the forest region. In the non-limiting example where the object is a tree, such a unique pattern may be a bark print, a branch print/tree graph, a unique cut mark etc.

A unique position is defined as a position of an object that differs from positions of each other object in a forest region. Therefore, the unique position is preferably of such a level of accuracy (an accuracy of 5 m, 2 m, 1 m, or even less) that the position of adjacent objects can be distinguished from one another.

Figure 1:
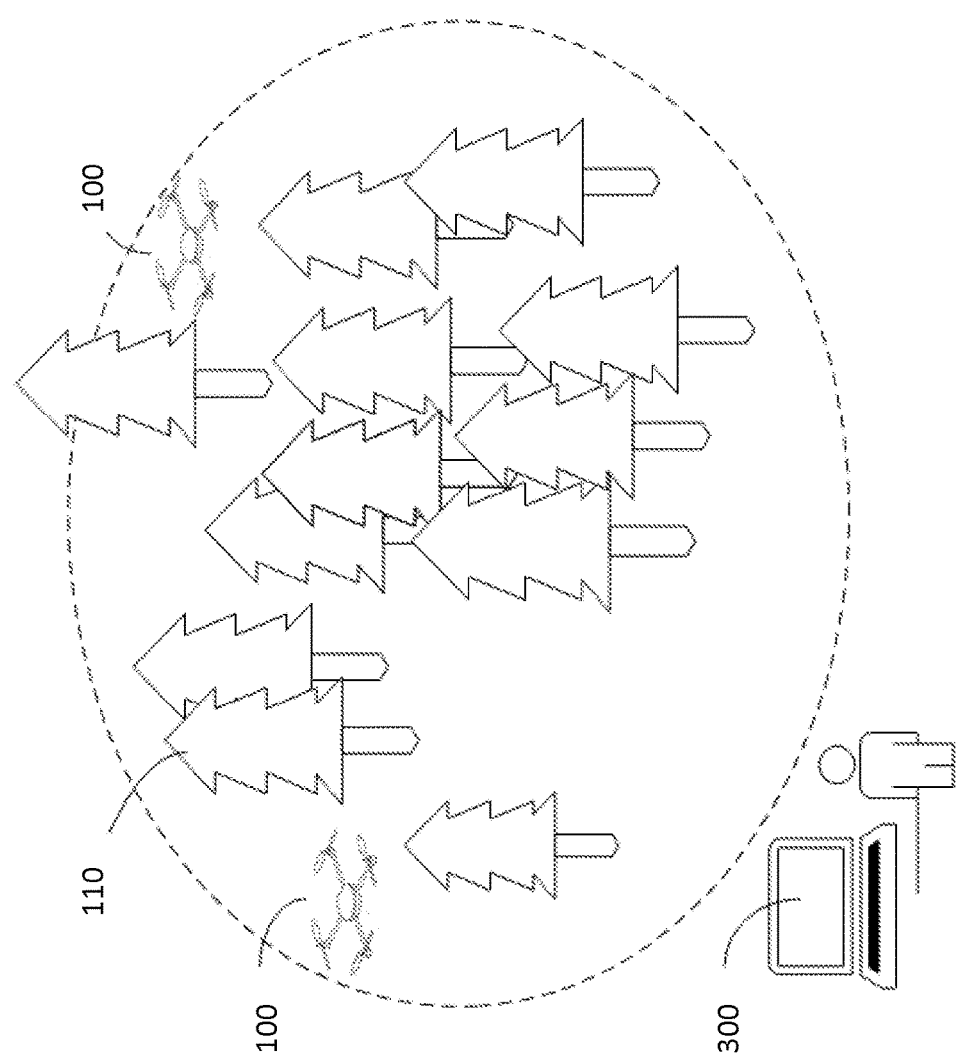

FIG. 1 describes the invention in a general way with a forest region comprising a plurality of objects 110 that may be trees. At least one un-manned vehicle 100 is configured to move through the forest region and to obtain sensor information associated with the objects 110, to assign an object identity ID to the object based on the sensor information using processing circuitry that may be comprised in the un-manned vehicle 100 or that can alternatively be accessible to the un-manned vehicle by being located in a remote control unit 300 that communicates with each of the un-manned vehicles 100. The at least one un-manned vehicle 110 is further configured to associate a marker 130 with the object 110 and the obtained sensor information and/or the object identity ID assigned to the object 110.

Based on the obtained sensor information or the object identity ID, the processing circuitry 210 may be configured to make a harvesting decision, and optionally to associate the marker also with the harvesting decision. A harvesting decision may hence be made by processing circuitry 210 comprised in the un-manned vehicle 110 in connection with the obtaining, using at least one sensor of the un-manned vehicle, information associated with the object, i.e. while the un-manned vehicle is moving under the canopy. Alternatively, the harvesting decision may be made by processing circuitry 210 comprised in the un-manned vehicle, in a harvester 150, or in a remote unit, at a later time. In some embodiments, the harvesting decision may be made by a human operator that uses information and the assigned object identities to make the decision for each object. The harvesting decision may be based on obtained sensor information or the object identity assigned to a single object, or obtained sensor information and/or object identities assigned to a plurality of objects. In some embodiments, the un-manned vehicle 100 is a single un-manned vehicle configured to perform the steps of for each of at least one object 110 within the forest region: obtaining, using at least one sensor 120 of the un-manned vehicle 100, information associated with the object 110; assigning an object identity (ID) to the object 110 based on the obtained sensor information, using processing circuitry 210 comprised in or accessible to the un-manned vehicle 100; obtaining a harvesting decision, using the processing circuitry 210, based on the obtained sensor information or the object identity (ID) assigned to the object 110; and associating a marker 130 with the object 110 and the harvesting decision on one single occasion, while moving under the canopy of the forest region.

In other embodiments, the un-manned vehicle 100 is a single un-manned vehicle configured to perform one or more of these steps at a first occasion, while moving under the canopy of the forest region, and the remaining steps at a second occasion, while moving under the canopy of the forest region.

In yet other embodiments, the un-manned vehicle 100 is defined as a set of two or more un-manned vehicles 100, wherein a first un-manned vehicle 100 of two or more un-manned vehicles 100 in the set is configured to perform one or more of these steps at a first occasion, while moving under the canopy of the forest region, and a second un-manned vehicle 100 of two or more un-manned vehicles 100 in the set is configured to perform the remaining steps at a second occasion, while moving under the canopy of the forest region.

The invention will now be described in more detail and a number of examples of embodiments of the invention will also be disclosed.

Device and System Architecture

Device and system embodiments will now be described with reference to FIGS. 2, 3, 5a and 5b.

Turning first to FIGS. 5a and 5b, there are shown two exemplary embodiments of the un-manned vehicle 100 according to the invention. In all embodiments herein, the un-manned vehicle 100 is configured to prepare for harvesting of forest and comprises: a body 101 configured to move through a forest region under the canopy; and at least one sensor 120 configured to obtain information associated with an object 110; wherein the un-manned vehicle 100 comprises or is communicatively connected to processing circuitry 210 configured to assign an object identity ID to the object 110 based on the obtained sensor information; and optionally make a harvesting decision based on the obtained sensor information or the object identity ID assigned to the object 110. The un-manned vehicle 100 is further configured to associate a marker 130 with the object 110 and the obtained sensor information or the object identity ID assigned to the object 110 and, optionally, the harvesting decision. The un-manned vehicle 100 may be an un-manned aerial vehicle, as illustrated in FIG. 5a, or an un-manned ground-based vehicle, as illustrated in FIG. 5b. In different embodiments, the un-manned vehicle 100 may be configured to be remote controlled, or may be an autonomous vehicle.

In some embodiments, the marker 130 may be a physical marker, wherein the un-manned vehicle 100 is configured to associate the marker 130 with the object 110 by attaching the physical marker to the object 110 or a location in the immediate vicinity of the object 110, or placing the physical marker on the object 110 or a location in the immediate vicinity of the object 110. To achieve this, the un-manned vehicle 100 in these embodiments advantageously comprises marking equipment 102. The marking equipment 102 comprises suitable means for applying physical markers or wireless tags to objects. A physical markers may for example comprise one or more of the following: a radio frequency identification (RFID) tag or other wireless tag; spray paint or other paint; tape; plastic band or paper band; staples; a sticker; a cut mark or the like, which may be put there by the un-manned vehicle 100 for later recognition; or a chemical that can be recognized by a chemical sniffer sensor. The physical marker may be applied to the object by being dropped on or in a vicinity of the object, by being sprayed or painted on the object or being attached or stapled to the object or tied around the object.

In other embodiments, or in combination with the use of a physical marker, the marker 130 may be a digital marker, wherein the un-manned vehicle 100 is configured to associate the marker 130 with the object 110, and the obtained sensor information or the object identity ID assigned to the object 110 and, optionally, the harvesting decision, by storing the marker 130 in association with the obtained sensor information or object identity ID and, optionally, the harvesting decision in a memory 140. Some non-limiting examples of digital markers are a bark print, as illustrated in FIG. 6a to c, a branch print/tree graph, as illustrated in FIG. 7a to b, an image of a cut mark or other physical marker (which may have been put there by the un-manned vehicle using the marking equipment 102), a color pattern, temperature, humidity and/or chemical composition related with the object, or another unique feature or set of features that can be used to identify the object 110.

The physical or digital marker may further be associated with a location on a 2D map, a 3D map, a 3D model; a point cloud, or other to scale representation of the forest region.

The at least one sensor 120 of the unmanned vehicle 100 may comprise one or more of the following: a stereoscopic camera; a time of flight sensor; another imaging sensor; a chemical sniffer; a LIDAR sensor; or radar equipment.

Figure 2:
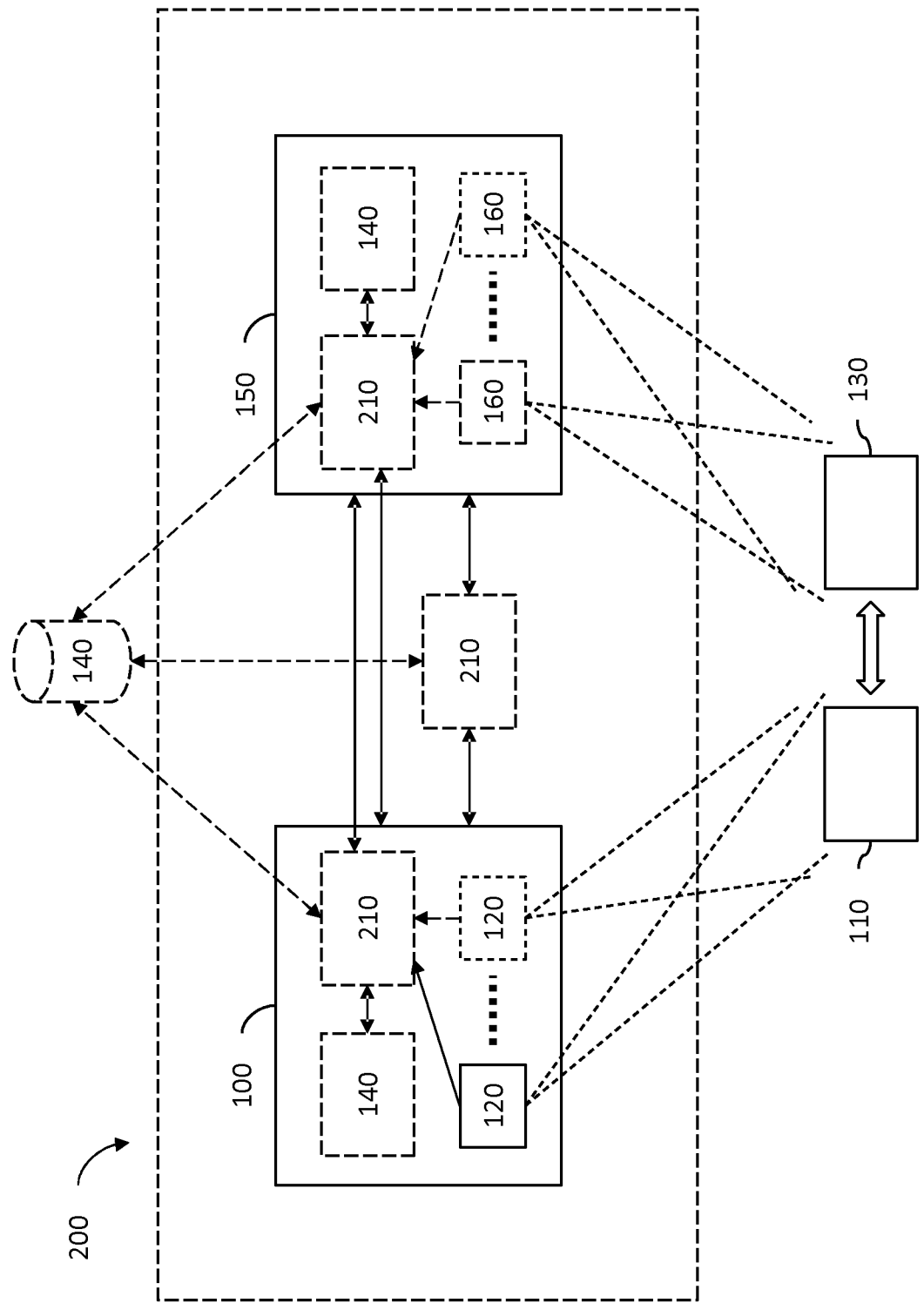
FIG. 2 is a schematic overview of a system for harvesting preparation, according to one or more embodiments.

FIG. 2 shows a harvesting preparation system 200 comprising at least one un-manned vehicle 100, according to any of the embodiments disclosed herein, and further comprising a remote control unit 300 comprising processing circuitry 210 and/or at least one additional un-manned vehicle 100, wherein said remote control unit 300 and/or additional un-manned vehicle 100 is/are communicatively connected to the un-manned vehicle 100. As a consequence, the method steps of any of the method embodiments described in connection with FIGS. 4a and 4b may be performed by processing circuitry 210 in the un-manned vehicle 100 or additional un-manned vehicle 100, or by processing circuitry 210 in the remote control unit 300. Of course, some method steps may also be performed by processing circuitry 210 in the un-manned vehicle 100 or additional un-manned vehicle 100 while others are performed by processing circuitry 210 in the remote control unit 300, depending on what is most suitable. In some embodiments, the remote control unit 300 may be configured to receive information associated with a plurality of markers 130 from the at least one un-manned vehicle 100 and to generate or update a map, or other 2D or 3D representation of the forest region, based on the received information.

Figure 3:
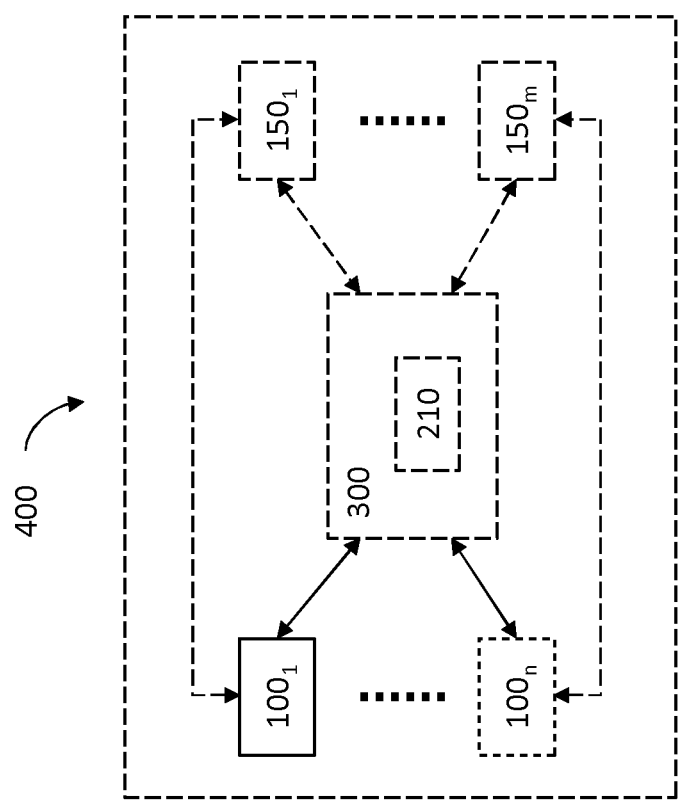
FIG. 3 is a schematic overview of a system for harvesting preparation, according to one or more embodiments.

As shown in the embodiments of FIG. 3, the invention also comprises a harvesting system 400 comprising at least one un-manned vehicle 100 according to any of the embodiments disclosed herein and further comprising at least one harvester 150, wherein each harvester 150 is communicatively connected to the at least one un-manned vehicle 100. Each harvester 150 of the harvesting system may be configured to recognize markers 130 and, if applicable, harvesting decisions associated with the markers 130, and further to perform one or more harvesting actions in a forest region based on said markers 130 and harvesting decisions, if such have been made and stored. Alternatively, as described herein by referring to "a later time", a harvesting decision may be made at the time of harvesting, by processing circuitry 210 comprised in the harvester, in an accompanying un-manned vehicle, or at a remote location, or by a manual operator making the decision and entering information into the harvester.

The processing circuitry 210 may for example comprise one or more processors. The processor(s) may for example be application-specific integrated circuits (ASIC) configured to perform a specific eye tracking and position determination method. Alternatively, the processor(s) may be configured to execute instructions (for example in the form of a computer program) stored in one or more memories 140. Such a memory 140 may for example be comprised in the system 200, or may be external to (for example located remotely from) the system 200. The memory 140 may store instructions for causing the system 200 to perform a method according to any of the embodiments presented in connection with FIGS. 4a, 4b and 8.

The processing circuitry 210 may in one or more embodiment be configured to perform any or all of the method embodiments described in connection with FIGS. 4a, 4b and 8.

It will be appreciated that the un-manned vehicle 100 and system 200 embodiments described above with reference to FIGS. 2, 3, 5a and 5b is provided as examples, and that many other un-manned vehicle and systems may be envisaged.

Method Embodiments

In the following, method embodiments will be described in connection with FIGS. 4a and 4b.

FIG. 4a shows embodiments of a method for preparing for harvesting of forest using an un-manned vehicle 100 configured to move under the canopy in a forest region, the method comprising, for each of at least one object 110 within the forest region:

In step 410: obtaining, using at least one sensor 120 of the un-manned vehicle 100, information associated with the object 110. The information may be dimensions of the object such as volume, height and/or surface area; a location of the object or limits of its extremities, a color of the object, an assigned object class such as a tree, a swamp, a boulder etc., or it can alternatively be machine learning segmentation or classification results of the object.

In one non-limiting example, one or more of the at least one sensor 120 is configured to gather terrain information. For example, the one or more of the at least one sensor 120 may be a Lidar sensor configured to gather information for generating a digital elevation model (DEM), a digital surface model (DSM), a digital terrain models (DTM), a triangular irregular networks (TIN) or any other suitable representation.

Each of the at least one object may for example be any of the following: a tree or a part of a tree, a boundary of an area, an area un-fitted for a harvester to travel across, a boulder, an existing path in the forest region, a preferred path to travel, an area for collecting cut logs, ancient remnants or monuments, or a biological object of protection.

In step 420: assigning an object identity (ID) to the object 110 based on the obtained sensor information, using processing circuitry 210 comprised in or accessible to the un-manned vehicle 100.

To assign the object ID based on the obtained sensor information may in different embodiments comprise processing 2D or 3D image data, measuring temperature or humidity (or detecting deviations of such measurements), and/or using chemical sniffing, just to mention a few examples.

In one or more embodiments, assigning an object ID to the object 110, using the processing circuitry 210, comprises analyzing the sensor information to determine at least one property of the object 110, and selecting an object ID, among a set of pre-stored object ID alternatives, based on the at least one property of the object. The prestored object ID alternatives may for example comprise IDs indicating that the object 110 is a tree to be cut, a tree not to be cut, an area that a harvester should not enter, an object that is not to be approached, or any other suitable identification information that is useful for harvesting purposes. The at least one property of the object may be an object type such as a tree, species of a tree, a swamp, a river, a downed log; or it could alternatively be a color, a surface roughness co-efficient, a size, a volume, a shape or a pattern of the object, or alternatively it could be a geographical location or an interaction with other object such as positioning with respect to terrain that could be upright, horizontal or at a particular angle to any of these directions.

In other embodiments, assigning an object ID to the object 110, using the processing circuitry 210, comprises: analyzing the obtained sensor information to determine a unique pattern associated with the object 110; generating a unique object ID, based on the determined unique pattern; and assigning the unique object ID to the object 110. In some embodiments, the obtained sensor information comprises 2D or 3D image data, or 3D point cloud data, and the unique pattern is determined through processing the image data or point cloud data to recognize a pattern. The unique object identity then enables a direct mapping between the real world object 110 and a corresponding object representation stored in memory 140. In some embodiments, the corresponding object representation is associated with a unique position on a 2D or 3D representation of the forest region. According to a non-limiting example, wherein the object 110 is a tree, the image pattern determined from the analysis of the obtained sensor information may be a bark print, indicative of visible features in the bark of the tree. This is illustrated in FIGS. 6a to 6c, wherein the bark of the object (tree) 110 comprises a number of features 601 recognizable from the 2D or 3D image data, or 3D point cloud data, gathered in relation to the object 110 by at least one sensor 120 of the un-manned vehicle 100. By analyzing the sensor information, in this case the 2D or 3D image data, or 3D point cloud data, comprising the features 601, the processing circuitry 210 is configured to, and method step 420 comprises, determining a pattern 602, as exemplified in FIG. 6b where the detected features 601 of the bark are connected to generate the pattern 602. The pattern 602, shown on without the object 110 in FIG. 6c, is unique to the object 110, and therefore suitable to be used as its unique object ID. According to another non-limiting example, wherein the object 110 is a tree, the image pattern determined from the analysis of the obtained sensor information may be a branch print, which may also be referred to as a tree print or a key graph, indicative of the branch distribution of the tree. This is illustrated in FIGS. 7a and 7b, wherein a number of features 701 in the form of endings of branches are recognized from the 2D or 3D image data, or 3D point cloud data, gathered in relation to the object 110 by at least one of the sensors 120 of the un-manned vehicle 100. By analyzing the sensor information, in this case the 2D or 3D image data, or 3D point cloud data comprising the features 701, the processing circuitry 210 is configured to, and method step 420 comprises, determining a pattern 702, as exemplified in FIG. 7b where the detected features 701 of the tree are connected to generate the pattern 702. The pattern 702 is unique to the object 110, and therefore suitable to be used as its unique object ID. Another example of what may constitute a pattern in the context of Step 420 is e.g. a color pattern relating to the object 110, recognizable by analyzing 2D or 3D data obtained by the at least one sensor 120 of the un-manned vehicle 100. Of course, depending on which sensor or sensors are deployed by the un-manned vehicle 100, other kinds of unique patterns may be generated. In different embodiments, the determined unique pattern may be a pattern as recognized directly by the sensors), or it could may a processed version of the pattern, as exemplified above.

In some embodiments, assigning an object ID to the object 110, using the processing circuitry 210, comprises analyzing the sensor information to determine a unique position associated with the object 110; generating a unique object ID, based on the determined unique position; and assigning the unique object ID to the object 110.

Of course, any combination of the embodiments described under step 420 may be used to generate an object ID for the object 110, wherein the object ID may comprise more than one type of information.

In an optional step 430: obtaining a harvesting decision, using the processing circuitry 210, based on the obtained sensor information or the object identity ID) assigned to the object 110.

In different embodiments, the harvesting decision may comprise a decision to harvest the object 110, how to harvest the object 110, to not harvest the object 110 or to avoid a location where the object 110 is situated or a specified area within which the object 110 is situated.

As illustrated in FIG. 4b, in some embodiments wherein the object 110 is a tree to be cut, the method step 430 of obtaining a harvesting decision based on the obtained sensor information may comprise, and the processing circuitry 210 may be configured to:

In sub-step 431: calculating, by the processing circuitry 210, a 3D shape of the trunk of the tree, based on the obtained sensor information.

In sub-step 432: calculating, by the processing circuitry 210, an optimal manner of cutting the tree trunk in at least one identified place in order to maximize the possible yield of high-quality wood for the tree or log.

In these embodiments, associating a marker 130 with the object 110 and the harvesting decision in Step 440 comprises:

In sub-step 441: physically marking each of the at least one identified place on the tree trunk, and/or digitally marking each of the at least one identified place on the tree trunk in a digital to scale 3D representation of the tree trunk.

The method, device and system according to embodiments presented herein may use the at least one sensors 120 of the un-manned vehicle 100, and marking equipment 102 to specifically mark where the harvester 150 should cut the tree or log, both at the base, and at precise intervals up the trunk. This will maximize the possible yield of high-quality wood, which may for example correspond to the maximum amount of useable wood, and/or the value of the cut wood, for each tree that is cut. What is the maximum possible yield of high-quality wood for a specific tree depends on what the wood is intended to be used for.

Optimization of the possible yield of high-quality wood for a tree, as exemplified in sub-steps 431, 432 and 441, is commonly referred to as bucking.

In step 440: associating a marker 130 with the object 110 and the obtained sensor information or the object identity ID assigned to the object 110.

If step 430 has been performed, step 440 may further comprise associating the marker 130 with the harvesting decision. In some embodiments, step 440 may comprise associating the marker 130 with the object 110 and the harvesting decision only, since the harvesting decision is based on and therefore comprises information on the obtained sensor information or the object identity ID assigned to the object 110.

To associate a marker can be to store a digital marker connected to the property or to the object identity in a memory, and/or to apply a physical marker to the object itself. The harvesting decision can be stored in the digital marker or the physical marker, or can alternatively be stored in association with the object identity. In one such example, the object identity can be that the object is a bog, and the associated harvesting decision can be to avoid that object.

The marker 130 may be a physical marker, wherein associating the marker 130 with the object 110 comprises attaching the physical marker to the object or a location in the immediate vicinity of the object, or placing the marker 130 on or in a vicinity of the object 110.

A physical markers may for example comprise one or more of the following: a radio frequency identification RFID) tag or other wireless tag; spray paint or other paint; tape; plastic band or paper band; staples; a sticker; a cut mark or the like, which may be put there by the un-manned vehicle 100 for later recognition; or a chemical that can be recognized by a chemical sniffer sensor. A chemical sniffer sensor can be placed on board the harvester.

Alternatively, or in combination with any of the above embodiments, the marker 130 may be a digital mark, wherein associating the marker 130 with the object 110 and the obtained sensor information or the object identity ID assigned to the object 110 and, optionally, the harvesting decision comprises storing the marker 130 in association with the obtained sensor information or the object identity ID and, optionally, the harvesting decision in the memory 140.

In some embodiments the method further comprises determining if the mission is completed or if there are more objects to be assessed. If it is determined that the mission is not completed, or that there is at least one more object to be assessed, the method returns to step 410. In other words, the method described in connection with FIG. 4a may be performed repeatedly, until the harvesting preparation mission is completed.

In some embodiments, the method further comprises determining a remaining power supply of the un-manned vehicle and determining if additional objects should be assessed based on the power supply and optionally also based on a power required to return to a place where the un-manned vehicle can be re-charged.

The processing circuitry 210 may correspondingly be configured to performing any of all of the method embodiments described in connection with steps 410 to 440.

In combination with any of the embodiments presented herein for harvesting preparation, wherein the marker 130 is a digital marker, the method may further comprise, and the processing circuitry may further be configured to, storing the information associated with the at least one object 110 together with the object ID of the object 110 and the associated marker 130 in a memory 140 accessible to the un-manned vehicle 100.

In combination with any of the embodiments presented herein for harvesting preparation, the method may further comprise generating a to scale 2D or 3D representation of at least a part of the forest region, or updating a to scale 2D or 3D representation of at least a part of the forest region by adding the marker associated with the object to the 2D or 3D representation. The 2D or 3D representation may for example be a 2D or 3D map or model of the forest region, comprising position information.

Based on information gathered by the un-manned vehicle, a harvesting path can be determined so that harvesting is performed in an optimized way. The harvesting path is based on information associated with at least the markers associated with the objects, but may also be decided based on other information relating to objects in the forest region such as their object identities, and preferably also based on the to scale 2D or 3D representation of at least a part of the forest region. Suitably, the harvesting path is also decided based on at least one property of the harvester. In some embodiments, the harvesting path may also be decided based on making connections between the locations of all of the different objects and the interactions between each object and a shape of the terrain, distribution of rivers or nearby roads, etc.

FIG. 8 shows a flow chart of a method according to one or more embodiment, wherein steps 410 to 440 corresponds to steps 410 to 440 described in connection with FIG. 4a, the method further comprising:

In step 810: recognizing, by a harvester 150 the marker 130, using at least one sensor 160 of the harvester 150.

In step 820: obtaining, by the harvester 150, a harvesting decision for the object 110.

In some embodiments, wherein the obtained harvesting decision is a harvesting decision associated with the recognized marker 130. In other embodiments, obtaining a harvesting decision for the object 110 comprises generating, by processing circuitry 210 or by a manual operator, a harvesting decision in any manner described herein.

In step 830: performing, by the harvester 150, a harvesting action based on the harvesting decision related to the object 110.

Recognizing the marker may comprise digital image processing of data received from an imaging sensor, the processing comprising segmentation; feature recognition; or color recognition, particularly for identifying biological species; or recognition of chemical information using an electronic sniffer, in particular recognizing methane to find bogs or decomposing vegetation.

Further Embodiments

In one or more embodiment, there is provided a non-transitory computer-readable storage medium storing instructions which, when executed by processing circuitry 210 of the system 200, cause the system 200 to perform the method as defined in any of the method disclosed herein (in other words, in the claims, the summary, or the detailed description).

The non-transitory computer-readable storage medium may store instructions which, when executed by processing circuitry 210 of the system 200, cause the system 200 to obtain information associated with the object 110; assign an object identity, ID, to the object 110 based on the obtained sensor information; optionally obtain a harvesting decision based on the obtained sensor information or the object identity ID assigned to the object 110; and associate a marker 130 with the object 110, the obtained sensor information or object identity ID and, if this has been obtained, the harvesting decision.

In one or more embodiments, the non-transitory computer-readable storage medium may further store instructions which, when executed by processing circuitry 210 of the system 200, cause the system 200 to perform the steps or functions according to any of the method embodiments described herein.

The non-transitory computer-readable storage medium may for example be provided in a computer program product. In other words, a computer program product may for example comprise a non-transitory computer-readable storage medium storing instructions which, when executed by the processing circuitry 210 of the system 200, cause the system 200 to perform the method as defined in any of the method embodiments.

As described above with reference to FIG. 2, the storage medium need not necessarily be comprised in the system 200.

Exemplary Embodiments

In the following, six further embodiments A-E will be described that show various applications of the present invention in different ways of preparing for harvesting of a forest. All the embodiments lie within the scope of the present invention.

A—Preparing for Harvesting and Applying Physical Markers in a Forest Region

At least one un-manned vehicle is guided through a forest region and configured to obtain information relating to a plurality of objects that are then marked with a number of physical markers that are visible to a harvester or a person operating a harvester in a subsequent harvesting operation.

The un-manned vehicle may be a drone that flies through the forest region under the canopy or may alternatively be a drone configured to move on the ground in the forest region. The un-manned vehicle can act autonomously but could alternatively be controlled by a remote control unit or by an operator that operates the un-manned vehicle directly. In order for the un-manned vehicle to be able to move through the forest region it is advantageous if it comprises equipment for detecting its surroundings in order to navigate between trees and other objects and also in order to identify those objects that should be assessed and prepared for harvesting. Depending on what is suitable for a particular harvesting operation that is to take place later, the un-manned vehicle can be configured to assess only trees that are large enough to be interesting from a harvesting perspective, such as trees that have a height over a threshold value such as 2 m, 4 m or 10 m or trees that have a maximum diameter over a threshold value, for instance 20 cm or 30 cm. Alternatively, the un-manned vehicle can also be configured to look at other objects beside trees such as areas that contain water on the ground (i.e. rivers, ditches or lakes) or where the ground is soft (such as swamps or bogs). This can be detected by the un-manned vehicle having sensors for detecting humidity or having imaging equipment and being able to analyze images so that such areas can be identified based on images taken by the un-manned vehicle.

Once in the forest region, the un-manned vehicle can assess each object that is identified as suitable for assessment, for instance by identification in images captured by the un-manned vehicle, e.g. in the form of a drone, as described above. Each object is assessed by information relating to the object being obtained by the un-manned vehicle, either by a sensor or sensors detecting information relating to the object or by information being obtained through a connection with a remote control unit or the like. If the information is obtained from a remote control unit it can be information that has been gathered previously and that relates to the object itself or an area where the object is situated, among other things. If the un-manned vehicle itself captures the information using at least one sensor the information can be measurements relating to the object such as a height or width of a tree, a species to which the tree belongs and that can be recognized by imaging recognition, or anything else that is relevant when assessing the object for harvesting purposes.

Based on the information, an object identity is assigned to the object. In its simplest form, the un-manned vehicle can use pre-set classes or object identity alternatives (i.e. categories or classes of objects) and fit the object into one of them based on the information. Examples can be "tree suitable for harvesting" where criteria for fitting into that object identity alternative can be "tree is at least 3 m high", "tree has a maximum diameter of at least 20 cm" or "tree is species type '*Pinus sylvestris*'". Any combination of criteria can be required for the object to fit into the object identity alternative. Another example can be "area that should be avoided by the harvester" where criteria for fitting into that object identity alternative can be "area has a humidity above a threshold value" or "groundcover has more than 50% coverage with species type '*Dicranum scoparium*'" or "area contains rocks larger than a given size" or even "area contains an object or set of objects that can be identified as ancient remains".

Alternatively, an object identity can be assigned by deciding a unique object identity that uniquely identifies the object itself, for instance by obtaining a bark print or other characteristic of a tree that separates it from other similar trees. Or alternatively the object identity can be a precise location where the object is located; this can be determined by the un-manned vehicle comprising equipment for detecting its own location accurately or by a remote control unit being able to determine accurately where the un-manned vehicle is and send this information to the un-manned vehicle.

Once the object identity has been assigned to the object, a harvesting decision may be made that determines if or how the object should be harvested. In some cases, the harvesting decision is made by the un-manned vehicle itself based on pre-set criteria and in other cases the remote control unit makes the decision and transmits it to the un-manned vehicle. In yet other cases the harvesting decision may be made by a human operator and it can be made after the marking of the object has taken place.

In most cases, however, the un-manned vehicle itself will make the harvesting decision and it will associate a marker with the object. The un-manned vehicle comprises marking equipment for placing or attaching physical markers on or at the object, and this can for example be in the form of spray paint that the un-manned vehicle sprays on the object or in the form of a paper band that is fastened around the object of directly on a surface of the object. The marker may become attached to or stick to the surface of the object or a location in the vicinity of the object, as defined herein. The marker may in any embodiment described herein further be configured to be detachable. The un-manned vehicle 110 may further be configured to detach and collect the marker from the object after harvesting. Other examples are also possible as described further above. Where the markers are spray paint this can be in different colors to indicate the object identity or the harvesting decision so that it is easily detectable to the harvester or operator controlling the harvester.

Once a desired number of objects have been assessed or the un-manned vehicle has traveled through a specific forest region, the harvesting preparations have been completed. In some examples the un-manned vehicle is configured to communicate its data continuously to the control unit or to other un-manned vehicles that form part of the same system, and in other examples the data is transmitted all at once after harvesting preparations are completed or the data is kept in a memory storage unit on the un-manned vehicle itself.

B—Preparing for Harvesting and Applying Digital Markers in a Forest Region

At least one un-manned vehicle is guided through a forest region and configured to obtain information relating to a plurality of objects that are then marked with a number of digital markers that are stored in a point cloud or in a 2D or 3D representation of the forest region and that is supplied to a harvester or a person operating a harvester in a subsequent harvesting operation.

The un-manned vehicle may be a drone that flies through the forest region under the canopy or may alternatively be a drone configured to move on the ground in the forest region. Hereinafter, the terms un-manned vehicle and drone may be used interchangeably and are both to be interpreted, within this context, as being any type of un-manned vehicle, unless specifically stated otherwise. The drone can act autonomously but could alternatively be controlled by a remote control unit or by an operator that operates the drone directly. In order for the drone to be able to move through the forest region it is advantageous if it comprises equipment for detecting its surroundings in order to navigate between trees and other objects and also in order to identify those objects that should be assessed and prepared for harvesting. Depending on what is suitable for a particular harvesting operation that is to take place later, the drone can be configured to assess only trees that are large enough to be interesting from a harvesting perspective, such as trees that have a height over a threshold value such as 2 m, 4 m or 10 m or trees that have a maximum diameter over a threshold value, for instance 20 cm or 30 cm. Alternatively, the drone can also be configured to look at other objects beside trees such as areas that contain water on the ground (i.e. rivers, ditches or lakes) or where the ground is soft (such as swamps or bogs). This can be detected by the drone having sensors for detecting humidity or having imaging equipment and being able to analyze images so that such areas can be identified based on images taken by the drone.

Once in the forest region, the un-manned vehicle can assess each object that is identified as suitable for assessment, for instance by identification in images captured by the drone as described above. Each object is assessed by information relating to the object being obtained by the drone, either by a sensor or sensors detecting information relating to the object or by information being obtained through a connection with a remote control unit or the like. If the information is obtained from a remote control unit it can be information that has been gathered previously and that relates to the object itself or an area where the object is situated, among other things. If the drone itself captures the information using at least one sensor the information can be measurements relating to the object such as a height or width of a tree, a species to which the tree belongs and that can be recognized by imaging recognition, or anything else that is relevant when assessing the object for harvesting purposes.

Based on the information, an object identity is assigned to the object. In its simplest form, the drone can use pre-set classes or object identity alternatives (i.e. categories or classes of objects) and fit the object into one of them based on the information. Examples can be "tree suitable for harvesting" where criteria for fitting into that object identity alternative can be "tree is at least 3 m high", "tree has a maximum diameter of at least 20 cm" or "tree is species type '*Pinus sylvestris*'". Any combination of criteria can be required for the object to fit into the object identity alternative. Another example can be "area that should be avoided by the harvester" where criteria for fitting into that object identity alternative can be "area has humidity above a threshold value" or "area contains rocks larger than a given size" or even "area contains an object or set of objects that can be identified as ancient remains".

Alternatively, an object identity can be assigned by deciding a unique object identity that uniquely identifies the object itself, for instance by obtaining a bark print or other characteristics of a tree that separates it from other similar trees. Or alternatively the object identity can be a precise location where the object is located; this can be determined by the drone comprising equipment for detecting its own location accurately or by a remote control unit being able to determine accurately where the drone is and send this information to the drone. In some embodiments, the un-manned vehicle may comprise positioning equipment for determining a position using GPS, GLONASS, accelerometer(s), radio equipment for radio triangulation, a radio reference node, imaging device and access to image processing equipment for image matching, or any other system for global or other positioning in the real world, or a combination of any of these.

Once the object identity has been assigned to the object, a harvesting decision may be made that determines if or how the object should be harvested. In some cases, the harvesting decision is made by the drone itself based on pre-set criteria and in other cases the remote control unit makes the decision and transmits it to the drone. In yet other cases the harvesting decision may be made by a human operator and it can be made after the marking of the object has taken place. In some embodiments, the harvesting decision may be made by a computer algorithm that takes into account all objects in the harvesting area and optimizes the harvesting path based on the associations between each object and the type of harvester. Different harvesters have different parameters regarding how steep or boggy terrain they can cover and a harvesting path may suitably be determined based on this.

In most cases, however, the drone itself will make the harvesting decision and it will associate a marker with the object. The markers are digital markers that are stored in the form of a series of data points as a point cloud or in a 2D or 3D representation of the forest region (i.e. a map). In some examples the drone makes a map based on the data points but in other embodiments the data points are used to update a pre-existing map to contain both a representation of the area and the object identities and/or harvesting decisions taken within that area.

In some examples, the drone communicates its data to the remote control unit where they are stored and the map is made or updated, but in other examples the data is stored in a memory unit on the drone itself. In some cases, a plurality of drones may act independently of each other or synchronized to assess different parts of a forest region and to combine their data into one map or point cloud.

C—Preparing for Harvesting and Applying Long Range Wireless Tags in a Forest Region At least one un-manned vehicle is guided through a forest region and configured to obtain information relating to a plurality of objects that are then marked with a number of long range, wireless tags that are visible to a harvester or a person operating a harvester in a subsequent harvesting operation.

The un-manned vehicle may be a drone that flies through the forest region under the canopy or may alternatively be a drone configured to move on the ground in the forest region. The drone can act autonomously but could alternatively be controlled by a remote control unit or by an operator that operates the drone directly. In order for the drone to be able to move through the forest region it is advantageous if it comprises equipment for detecting its surroundings in order to navigate between trees and other objects and also in order to identify those objects that should be assessed and prepared for harvesting. Depending on what is suitable for a particular harvesting operation that is to take place later, the drone can be configured to assess only trees that are large enough to be interesting from a harvesting perspective, such as trees that have a height over a threshold value such as 2 m, 4 m or 10 m or trees that have a maximum diameter over a threshold value, for instance 20 cm or 30 cm. Alternatively, the drone can also be configured to look at other objects beside trees such as areas that contain water on the ground (i.e. rivers, ditches or lakes) or where the ground is soft (such as swamps or bogs). This can be detected by the drone having sensors for detecting humidity or having imaging equipment and being able to analyze images so that such areas can be identified based on images taken by the drone.

Once in the forest region, the un-manned vehicle can assess each object that is identified as suitable for assessment, for instance by identification in images captured by the drone as described above. Each object is assessed by information relating to the object being obtained by the drone, either by a sensor or sensors detecting information relating to the object or by information being obtained through a connection with a remote control unit or the like. If the information is obtained from a remote control unit it can be information that has been gathered previously and that relates to the object itself or an area where the object is situated, among other things. If the drone itself captures the information using at least one sensor the information can be measurements relating to the object such as a height or width of a tree, a species to which the tree belongs and that can be recognized by imaging recognition, or anything else that is relevant when assessing the object for harvesting purposes.

Based on the information, an object identity is assigned to the object. In its simplest form, the drone can use pre-set classes or object identity alternatives (i.e. categories or classes of objects) and fit the object into one of them based on the information. Examples can be "tree suitable for harvesting" where criteria for fitting into that object identity alternative can be "tree is at least 3 m high", "tree has a maximum diameter of at least 20 cm" or "tree is species type '*Pinus sylvestris*'". Any combination of criteria can be required for the object to fit into the object identity alternative. Another example can be "area that should be avoided by the harvester" where criteria for fitting into that object identity alternative can be "area has humidity above a threshold value" or "area contains rocks larger than a given size" or even "area contains an object or set of objects that can be identified as ancient remains".

Alternatively, an object identity can be assigned by deciding a unique object identity that uniquely identifies the object itself, for instance by obtaining a bark print or other characteristics of a tree that separates it from other similar trees. Or alternatively the object identity can be a precise location where the object is located; this can be determined by the drone comprising equipment for detecting its own location accurately or by a remote control unit being able to determine accurately where the drone is and send this information to the drone.

Once the object identity has been assigned to the object, a harvesting decision may be made that determines if or how the object should be harvested or the optimized route to conduct the entire harvesting zone. In some cases, the harvesting decision is made by the drone itself based on pre-set criteria and in other cases the remote control unit makes the decision and transmits it to the drone. In yet other cases the harvesting decision may be made by a human operator and it can be made after the marking of the object has taken place.

In most cases, however, the drone itself will make the harvesting decision and it will associate a marker with the object. The markers are in this example long range wireless tags such as RFID tags that are applied by being ejected from the drone in such a way that they contact the object that they designate. For instance, the drone may carry a gun or similar and shoot the tags onto a surface of a tree or down into the ground. Each tag comprise components for transmitting a signal that either uniquely identifies the tag or that identifies the tag as belonging to a particular group or tags. Furthermore, the tag may comprise identificators that serve to make the tag more visible to the harvester or the operator driving the harvester, such as the tag being able to light up, make a sound or emit smoke or a chemical signal when harvesting is to take place.

What is described above in examples A, B and C generally disclose similar ways of assessing a plurality of objects in order to prepare for harvesting of a forest region but differs in the way that the objects are marked. It is also possible within the scope of the present invention to combine the different types of markers so that the drone applies physical markers or wireless tags to the objects and also generates digital markers that are stored or updated in a database, point cloud or map of the region. Also, the drone could be configured to select physical markers or wireless tags for each object depending on the object identity or the information relating to the object, so that for instance spray paint could be used for trees and wireless tags for areas to be avoided.

D—Preparing for Harvesting and Marking Ways to Optimally Cut a Tree

At least one un-manned vehicle is guided through a forest region and configured to obtain information relating to a plurality of objects that are then marked so that a harvester or a person operating a harvester in a subsequent harvesting operation will be able to harvest the objects in a predetermined way.

The un-manned vehicle may be a drone that flies through the forest region under the canopy or may alternatively be a drone configured to move on the ground in the forest region. The drone can act autonomously but could alternatively be controlled by a remote control unit or by an operator that operates the drone directly. In order for the drone to be able to move through the forest region it is advantageous if it comprises equipment for detecting its surroundings in order to navigate between trees and other objects and also in order to identify those objects that should be assessed and prepared for harvesting. Depending on what is suitable for a particular harvesting operation that is to take place later, the drone can be configured to assess only trees that are large enough to be interesting from a harvesting perspective, such as trees that have a height over a threshold value such as 2 m, 4 m or 10 m or trees that have a maximum diameter over a threshold value, for instance 20 cm or 30 cm.

Once in the forest region, the un-manned vehicle can assess each object that is identified as suitable for assessment, for instance by identification in images captured by the drone as described above. For each object that is determined to be a tree suitable for harvesting, the drone uses at least one sensor to obtain information of the object and determined an optimal way to harvest that particular tree (i.e. bucking). Preferably, the sensor comprises imaging equipment so that images of the object can be captured.

Based on the images and possibly other information gathered by sensors, a 3D shape of the trunk of the tree is calculated. It is advantageous to capture a series of images from different positions in relation to the tree so that a 3D shape is more easily determined. Then, an optimal manner of cutting the tree trunk is determined with the aim of maximizing the possible yield of high-quality wood for the tree or for a log based on the tree. The drone may comprise pre-set criteria for which shapes of wood are seen as desirable, such as logs having a specific length or logs that have a uniform circumference along a given portion of their length, for instance. Also, depending on where branches are located on the tree criteria can include cutting the tree in different ways to distribute the portions on the log where the branches start in certain ways, or based on the 3D shape of the trunk the tree could be cut to maximize the yield regardless of other criteria. The drone thus identifies at least one identified place where the tree should be cut in order to harvest the tree in the best possible way in view of specific criteria or just to maximize the yield.

As in other embodiments, the drone associates an object identity with the tree and this is preferably a unique object identity so that the individual information gathered for the tree is associated with a unique object identity, so that the detailed information of how the tree should be harvested can be used by the harvester or operator driving the harvester later. The harvesting decision is in this example the individual information of how the tree should be cut in the optimal way.

The drone also associates at least one marker with the tree. This may be a physical marker such as spray paint from a paint gun or similar included in the marking equipment on the drone or a cut in the bark that is made with a knife or the like that is also included in the marking equipment. The physical marker is applied to at least one identified place on the tree trunk, preferably where the cut should begin or end when the tree is harvested. For more complicated harvesting of the tree a plurality of locations on the trunk can be marked in this way. Thus, the drone can specifically mark where the harvester should cut the tree or log, both at the base, and at precise intervals up the trunk. This will maximize the possible yield of high-quality wood, which may for example correspond to the maximum amount of useable wood, and/or the value of the cut wood, for each tree that is cut. What is the maximum possible yield of high-quality wood for a specific tree depends on what the wood is intended to be used for.

The drone can also associate a digital marker with the tree, and this may be in the form of a point or an area in a digital to scale 3D representation of the tree trunk that may be stored in the drone or transmitted to a control unit for storage in a memory unit. The drone could also associate both physical markers and digital markers with each object.

Once the drone has assessed a suitable number of objects that are trees suitable for harvesting, or once the drone has passed through a forest region that is to be harvested, the digital markers showing the optimal cutting of each tree can be used by a harvester or an operator controlling the harvester to harvest the trees that have been assessed. The digital markers can be used in the form of a number of markers that are identified as they match with the trees to which they correspond but they can also be provided in a map or model of the forest region to make it easier to locate each individual tree.

This example for how to prepare for harvesting can advantageously be combined with either of the examples A-C disclosed above. For instance, any of the examples A-C can be used to identify object suitable for harvesting and what is said above with reference to example D can be used to plan for the optimal harvesting of those objects once they have been identified.

E—Preparing for Harvesting by Using a Plurality of Sensors for Locating Objects

In this example that can be combined with either of the examples A-D described above, an un-manned vehicle is used to detect and locate objects using other types of sensors in order to detect properties that are not based on imaging and that are not provided by a remote control unit that has access to previously obtained information.

Such other types of sensors may be sensors configured to detect chemical compounds, humidity, temperature and ambient light, for instance. This is suitable for more accurately detecting the presence of a bog or swamp by detecting any of a number of chemicals that are commonly emitted from such areas. It can also be used to detect ground humidity in order to locate areas that are too wet and unstable for a harvester to be able to drive on, or areas that differ from their surroundings in temperature. This may indicate areas that are still frozen early in the year or that have begun to freeze in the autumn so that driving a harvester there is easier or more difficult than at other times. Also, flowing water that has a lower temperature than surrounding areas can be located. By detecting ambient light it can be assessed how much vegetation is present on the ground or how dense the forest is in that region and thus how easy or difficult it is to drive there with the harvester.

Thus, when using the drone for harvesting preparations according to this example, the drone moves through a forest region and gathers sensor information that relates to objects such as areas of the forest that are not deemed to be trees.

There may also be some information that can be gathered by such sensors relating to trees as well, although the main uses are for locating and correctly identifying and assessing the ground in order to determine a suitable harvesting operation in the region.

The person skilled in the art realizes that the present invention is by no means limited to the preferred embodiments and examples described above. On the contrary, many modifications and variations are possible within the scope of the appended claims. For example, the embodiments described above with reference to FIG. 3 may, as explained herein, be performed in different orders and/or be combined with additional method steps to form further embodiments. Further, it will be appreciated that the system 200 shown in FIG. 2 is merely intended as an example, and that other systems may also perform the methods described above with reference to FIG. 3.

It will be appreciated that the processing circuitry 210 (or a processor) may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide computer functionality, either alone or in conjunction with other computer components (such as a memory or storage medium).

It will also be appreciated that a memory or storage medium (or a computer-readable medium) may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by a processor or processing circuitry.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. In the claims, the word "or" is not to be interpreted as an exclusive or (sometimes referred to as "XOR"). On the contrary, expressions such as "A or B" covers all the cases "A and not B", "B and not A" and "A and B", unless otherwise indicated. The mere fact that certain measures are recited in mutually different dependent claims does not indicate that a combination of these measures cannot be used to advantage. Any reference signs in the claims should not be construed as limiting the scope.

It is also to be noted that features from the various embodiments described herein may freely be combined, unless it is explicitly stated that such a combination would be unsuitable.

The invention claimed is:

1. A method for preparing for harvesting of forest, the method comprising:
   for each of at least one tree within a forest region, where the tree has not been felled:
      obtaining, using at least one sensor of an un-manned vehicle moving under the canopy in a forest region, information associated with the tree;
      assigning an object identity (ID) to the tree based on the obtained sensor information, using processing circuitry comprised in or accessible to the un-manned vehicle;
      associating a marker with the tree and the obtained sensor information or the object identity (ID) assigned to the tree, wherein the associating comprises marking at least one identified place on the trunk of the tree;
      obtaining a harvesting decision, using the processing circuitry, based on the obtained sensor information or the object identity (ID) assigned to the tree;
      associating the marker also with the harvesting decision;
      recognizing the marker, using at least one sensor of a harvester;
      obtaining the harvesting decision for the tree associated with the recognized marker; and
      performing a harvesting action based on the harvesting decision related to the tree, wherein the harvesting action comprises cutting the trunk of the tree at the at least one identified place.

2. The method of claim 1, wherein assigning an object identity (ID) to the tree, using the processing circuitry, comprises:
   analyzing the sensor information to determine at least one property of the tree; and
   selecting an object identity (ID), among a set of pre-stored object identity alternatives, based on the at least one property of the object.

3. The method of claim 1, wherein assigning an object identity (ID) to the tree, using the processing circuitry, comprises:
   analyzing the sensor information to determine a pattern that uniquely identifies the tree;
   generating a unique object identity (ID), based on the determined pattern; and
   assigning the identity (ID) to the tree.

4. The method of claim 3 further comprising storing the information associated with the at least one tree together with the object identity (ID) and the associated marker in a memory accessible to the un-manned vehicle.

5. The method of claim 1, wherein assigning an object identity (ID) to the tree, using the processing circuitry, comprises:
   analyzing the sensor information to determine a position that uniquely identifies the tree;
   generating a unique object identity (ID), based on the determined position; and
   assigning the identity (ID) to the tree.

6. The method of claim 1, wherein the harvesting decision is a decision to harvest the object, how to harvest the object, to not harvest the object or to avoid a location where the object is situated or a specified area within which the tree is situated.

7. The method of claim 1, further comprising generating a to scale 2D or 3D representation of at least a part of the forest region, or updating a to scale 2D or 3D representation of at least a part of the forest region by adding the marker associated with the object to the 2D or 3D representation.

8. The method of claim 1, wherein the marker is a physical marker and wherein associating the marker with the tree comprises attaching the physical marker to the tree or a location in the immediate vicinity of the tree, or placing the marker on or in a vicinity of the tree.

9. The method of claim 1, wherein the marker is a digital marker and wherein associating the marker with the tree and the harvesting decision comprises storing the marker in association with the object identity (ID) and the harvesting decision in a memory.

10. The method of claim 1, wherein obtaining a harvesting decision based on the obtained sensor information comprises:
   calculating, by the processing circuitry, a 3D shape of the trunk of the tree, based on the obtained sensor information; and
   calculating, by the processing circuitry, an optimal manner of cutting the tree trunk in at least one identified place in order to maximize the possible yield of high-quality wood for the tree,
wherein associating a marker with the tree and the harvesting decision comprises physically marking each of the at least one identified place on the tree trunk, or digitally marking each of the at least one identified place on the tree trunk in a digital to scale 3D representation of the tree trunk.

11. The method of claim 1, further comprising generating a harvesting path based on a plurality of markers associated with objects, or the information associated with the plurality of markers, and preferably also based on a to scale 2D or 3D representation of at least a part of the forest region.

12. The method of claim 1, wherein the harvesting action comprises cutting the trunk of the tree in multiple places, wherein the places are determined using the information associated with the tree.

13. The method of claim 1, wherein marking comprises physically marking the trunk of the tree.

14. The method of claim 1, wherein marking comprises marking the tree trunk in a digital to scale 3D representation of the tree trunk.

15. A system comprising:
   (a) an un-manned vehicle, comprising:
      a body configured to move through a forest region under the canopy; and
      at least one sensor configured to obtain information associated with a tree within the forest region as the body moves under the canopy of the forest region, where the tree is a tree that has not been felled;
   wherein the un-manned vehicle comprises or is communicatively connected to processing circuitry configured to assign an object identity (ID) to the tree based on the obtained sensor information, wherein the un-manned vehicle is further configured to associate a marker with the tree and the obtained sensor information or the object identity (ID) assigned to the tree, wherein the association includes associating the marker with an identified place on the tree, wherein the processing circuitry is further configured to make or obtain a harvesting decision based on the obtained sensor information or the object identity (ID) assigned to the tree, and wherein the un-manned vehicle is further configured to associate the marker with the harvesting decision;
   (b) a harvester, wherein the harvester is communicatively connected to the processing circuitry that is comprised in or communicatively connected to the at least one un-manned vehicle and wherein the harvester is configured to recognize the marker and cut the trunk of the tree at the identified place based on the information associated with the marker.

16. The system of claim 15, wherein the marker is a physical marker and wherein the un-manned vehicle is configured to associate the marker with the tree by attaching the physical marker to the tree or a location in the immediate vicinity of the tree, or placing the physical marker on the tree or a location in the immediate vicinity of the tree.

17. The system of claim 15, wherein the marker is a digital marker and wherein the un-manned vehicle is configured to associate the marker with the tree and the harvesting decision by storing the marker in association with the object identity (ID) and the harvesting decision in a memory.

18. The system of claim 17, wherein the digital marker is a bark print, a branch print/tree graph, or an image of a cut mark.

19. The system of claim 15, wherein the marker is further associated with a location on a 2D map, a 3D map, a 3D model; a point cloud, or other to scale representation of the forest region.

20. The system according to claim 15 and further comprising a remote control unit comprising processing circuitry and/or at least one additional un-manned vehicle, wherein said remote control unit and/or additional un-manned vehicle is/are communicatively connected to the un-manned vehicle.

21. The system according to claim 20, wherein the remote control unit is configured to receive information associated with a plurality of markers from the at least one un-manned vehicle and to generate or update a map based on the received information.

* * * * *